United States Patent [19]

Konrad

[11] Patent Number: 5,376,869
[45] Date of Patent: Dec. 27, 1994

[54] ELECTRIC VEHICLE DRIVE TRAIN WITH ROLLBACK DETECTION AND COMPENSATION

[75] Inventor: Charles E. Konrad, Roanoke, Va.

[73] Assignee: General Electric Company, Schenectady, N.Y.

[21] Appl. No.: 16,551

[22] Filed: Feb. 11, 1993

[51] Int. Cl.⁵ .......................... H02P 3/10; H02H 3/17
[52] U.S. Cl. ...................................... 318/587; 318/139; 318/373; 364/426.2; 180/282
[58] Field of Search .................. 318/560–646, 318/139, 370–376; 364/424–426; 180/282, 65 A; 188/2 D; 361/31, 58, 93, 87; 192/4 A, 3 TR, 9

[56] References Cited

U.S. PATENT DOCUMENTS

| | | | |
|---|---|---|---|
| Re. 34,159 | 1/1993 | Harrington | 361/31 |
| 4,217,643 | 8/1980 | Anderson et al. | 364/426 |
| 4,351,405 | 9/1982 | Fields et al. | |
| 4,529,919 | 7/1985 | Melocik et al. | 318/373 |
| 4,629,043 | 12/1986 | Matsuo et al. | 192/4 A |
| 4,913,258 | 4/1990 | Sakurai et al. | |
| 5,040,088 | 8/1991 | Harrington | 361/31 |

FOREIGN PATENT DOCUMENTS

| | | |
|---|---|---|
| 0374960 | 6/1990 | European Pat. Off. |
| 0585122A2 | 3/1994 | European Pat. Off. |
| 2660258 | 10/1991 | France |
| 2411550 | 9/1975 | Germany |
| WO84/02813 | 7/1984 | WIPO |
| WO93/04888 | 3/1993 | WIPO |

*Primary Examiner*—Paul Ip
*Attorney, Agent, or Firm*—Bell, Seltzer, Park & Gibson

[57] ABSTRACT

An electric vehicle drive train includes a controller for detecting and compensating for vehicle rollback, as when the vehicle is started upward on an incline. The vehicle includes an electric motor rotatable in opposite directions corresponding to opposite directions of vehicle movement. A gear selector permits the driver to select an intended or desired direction of vehicle movement. If a speed and rotational sensor associated with the motor indicates vehicle movement opposite to the intended direction of vehicle movement, the motor is driven to a torque output magnitude as a nonconstant function of the rollback speed to counteract the vehicle rollback. The torque function may be either a linear function of speed or a function of the speed squared.

27 Claims, 5 Drawing Sheets

ELECTRIC VEHICLE DRIVE TRAIN WITH ROLLBACK DETECTION AND COMPENSATION

GOVERNMENT RIGHTS

The Government of the United States of America has rights in this invention pursuant to Contract No. DE-AC07-90ID13019 (Subcontract No. 47-2-111883) awarded by the U.S. Department of Energy.

FIELD OF THE INVENTION

The present invention relates to the field of electric vehicles, and more particularly, to a drive train for an electric vehicle including control of electric motor torque output.

BACKGROUND OF THE INVENTION

Electric vehicles are receiving considerable attention as a substitute for present gasoline-fueled vehicles. This interest is based primarily on zero atmospheric emissions obtainable from an all-electric vehicle. Several states are considering stricter emissions regulations for vehicles, and California has adopted regulations that will require zero emissions for a percentage of vehicles in certain urban areas. Electric vehicles also offer other advantages including reducing dependency on imported oil, since utilities in the United States generate a large portion of their energy demands using coal, gas, nuclear, and hydroelectric sources.

Even hybrid electric vehicles, such as those incorporating a small gasoline engine running at a constant speed to recharge an electric traction battery, offer anticipated lower emissions. See, for example, U.S. Pat. No. 4,351,405 to Fields et al. which discloses a hybrid vehicle including a gasoline engine for driving the front wheels during high speed and long distance driving, while the rear wheels are connected to electric motors for low speed and stop and go driving.

To obtain widespread acceptance as a suitable substitute for conventional gasoline-fueled vehicles, an electric vehicle should desirably mimic the operation of such a conventional gasoline vehicle, especially the drive train including a conventional automatic transmission. Functions such as braking and acceleration are readily controlled in an electric vehicle through a conventional brake pedal and accelerator pedal. The selection of drive, reverse, park, and neutral positions are also imitated on an electric vehicle. However, in a conventional gasoline vehicle, the engine always rotates in a same direction and the vehicle includes a clutch or fluid coupling to transmit torque to the vehicle wheels. In other words, a conventional automatic transmission will tend to start the vehicle moving forward, or creep, on a level surface once the driver releases the brake with the engine idling.

Moreover, starts upward on an incline are readily accommodated in a gasoline vehicle because the creep of the automatic transmission compensates for vehicle rollback during the time from when the driver releases the brake until the driver can depress the accelerator. In addition, even a conventional vehicle with a standard transmission includes numerous contributors of rolling friction which have a tendency to reduce the speed of rollback when starting upward on an incline.

An electric vehicle may have one or more electric motors directly driving the wheels as disclosed in U.S. Pat. No. 4,913,258 to Sakuri et al. Alternately, an electric vehicle may have an electric motor driving a set of wheels through a gearbox and differential. Since the electric motor does not typically "idle" as a conventional gasoline engine, a typical electric vehicle has a tendency to first roll backwards when starting upward on an incline. This rollback is particularly troublesome in traffic where the vehicle may roll backwards into the vehicle behind. In addition, when an electric vehicle rolls backward on a grade, the motor is rotating in a direction opposite to the desired direction of travel, and gear lash and drive shaft spring must first be taken up from the drive train before the vehicle may begin to move forward.

Current battery technology limits the driving range of an electric vehicle to be considerably less than a gasoline vehicle. Accordingly, much development has gone into reducing rolling friction of the tires and various mechanical train drive components of an electric vehicle to thereby improve efficiency and increase the driving range. Unfortunately, the reduced rolling friction exacerbates the problem of starting upward on an incline, since the electric vehicle has a tendency to roll back even faster.

Figure 1:
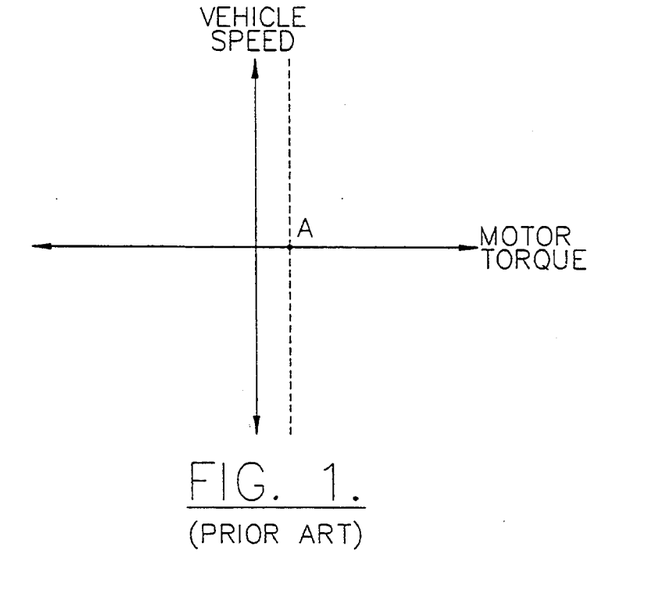
FIG. 1 is a graph of a motor torque and speed illustrating a constant torque independent of speed for providing creep in an electric forklift as in the prior art.

Battery powered vehicles, such as automobiles, forklifts, and other utility vehicles, typically include some form of motor control logic that may assist in starting the vehicle when the vehicle is positioned on a grade. Creep, as in a gasoline vehicle, has been simulated in an electric forklift for operation on a level surface as shown in the graph of vehicle speed versus motor torque of FIG. 1, wherein a forward direction of intended movement is selected. The forklift control computer applies power to the motor to generate a predetermined constant output torque indicated by Point A on the graph, irrespective of the vehicle speed.

It has also been common in electric vehicles to limit the rate at which torque output can be increased from the electric motor to provide for a smooth and jerk-free start. In other words, to compensate for the lack of a clutch or fluid coupling, such as a torque converter in a conventional gasoline-fueled vehicle, a timed ramp on either the motor terminal voltage or armature current has been used to regulate the rate of torque increase from the motor of an electric vehicle.

Unfortunately, the timed ramp function is undesirable for starting on a grade. For example, in order to limit the jerkiness when starting on a level surface, the timed ramp is set to a relatively slow initial setting so that torque does not build up too quickly; however, with this same setting, substantial rollback may still occur on a grade because of the slowness of increasing torque.

SUMMARY OF THE INVENTION

It is therefore object of the present invention to provide an electric vehicle drive train and associated method for counteracting rollback of the vehicle as when starting the vehicle upward on a grade.

It is another object of the present invention to provide a drive train and associated method for permitting smooth starting upward on a grade.

These and other objects, features and advantages of the invention are provided by an electric vehicle drive train including an electric motor being rotatable in opposite directions corresponding to respective opposite directions of actual vehicle movement, sensing means associated with electric motor for sensing its rotational direction, selector means for permitting driver selection of a direction of intended vehicle movement, and rollback detection and compensation means responsive to the sensing means and the selector means for determining vehicle rollback and for operating the electric motor to counteract the vehicle rollback. Vehicle rollback is defined by a sensed direction of actual vehicle movement opposite to a selected direction of intended vehicle movement. The direction of actual vehicle movement corresponds to a respective sensed rotational direction of the electric motor.

As would be readily understood by those skilled in the art, the drive train preferably counteracts "backward" rollback when the forward or "D" direction is selected and the vehicle is facing upward on an incline. Similarly, the drive train counteracts "forward" rollback when the "R" direction is selected and the vehicle is facing backwards up an incline. As would also be readily appreciated by those skilled in the art, the drive train may also advantageously provide a smooth transition when the vehicle is accidentally or inadvertently shifted into reverse, for example, while moving in a forward direction. The present invention also takes up gear lash and any spring in the drive shaft(s) to thereby provide smoother starting.

The sensing means associated with the motor preferably includes means for sensing a rotational speed of the motor which corresponds to the speed of the vehicle, since the motor is typically coupled to the vehicle wheels through a gear reduction transmission. Accordingly, the rollback detection and compensation means includes means for controlling the output torque magnitude of the electric motor as a nonconstant function of rotational speed of the motor during vehicle rollback. In one embodiment, the output torque magnitude is controlled as a linear function of rotational speed of the electric motor. In another embodiment, the output torque magnitude is controlled as a function of the square of the sensed rotational speed of the motor. Other nonconstant functions of torque control based upon speed are also contemplated by the present invention. The output torque magnitude of the electric motor is also preferably set at a predetermined constant value responsive to a rotational speed of the electric motor being above a predetermined value.

The electric motor is preferably an induction motor utilizing a form of vector control, such as achieved using a universal field orientation controller, while those skilled in the art will recognize that other types of electric motor drives having a controllable output torque magnitude may also be used. The drive train according to the invention also preferably includes a traction battery carried by the vehicle frame. The traction battery is also connected to the induction motor, such as through a suitable power control circuit including a DC-to-AC inverter.

The drive train preferably also includes driver input means for permitting driver selection of one of vehicle braking or vehicle acceleration. The driver input means also preferably includes conventional brake and accelerator pedals. Control means is preferably connected to the electric motor for controlling the output torque magnitude and rotational direction thereof in response to the accelerator and brake pedals during normal driving of the vehicle. The rollback detection and compensation means cooperates with the control means to counteract vehicle rollback even in an absence of driver selection of one of vehicle braking or acceleration, as when the driver is moving his foot from the brake pedal to the accelerator pedal. In other words, the drive train of the present invention will closely mimic the operation of a conventional gasoline-fueled vehicle having an automatic transmission, by preventing substantial rollback when starting upward on a hill. Rollback in an electric vehicle may be even more severe than may occur with a conventional vehicle, because rolling resistance is minimized in an electric vehicle to provide greater range for a given battery capacity.

Another aspect of the invention is that the rollback detection and compensation means includes means for generating a first torque request value as a function of rotational speed of the electric motor during vehicle rollback. The control means further includes means for generating a second torque request value responsive to the driver's selection of acceleration, for example, as when starting upward on an incline. Accordingly, the rollback detection and compensation means includes means for adding the first and second torque request values together to control the magnitude of the torque output of the electric motor. Thus, smoother acceleration from a rollback condition is also provided by the invention.

A method according to the invention for operating an electric vehicle includes the steps of sensing a rotational direction of the electric motor corresponding to a respective direction of actual vehicle movement, determining vehicle rollback defined by the sensed direction of actual vehicle movement being opposite the intended direction of vehicle movement, and operating the electric motor to counteract the vehicle rollback. The method further preferably includes the step of sensing the rotational speed of the electric motor. Accordingly, the step of operating the electric motor to counteract the vehicle rollback includes the step of operating the electric motor at an output torque magnitude as a nonconstant function of sensed rotational speed of the electric motor. This function may be either linear, or based upon the square of speed, or based upon another nonconstant function of speed.

DETAILED DESCRIPTION OF THE PREFERRED EMBODIMENTS

The present invention will now be described more fully hereinafter with reference to the accompanying drawings, in which a preferred embodiment of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 2:
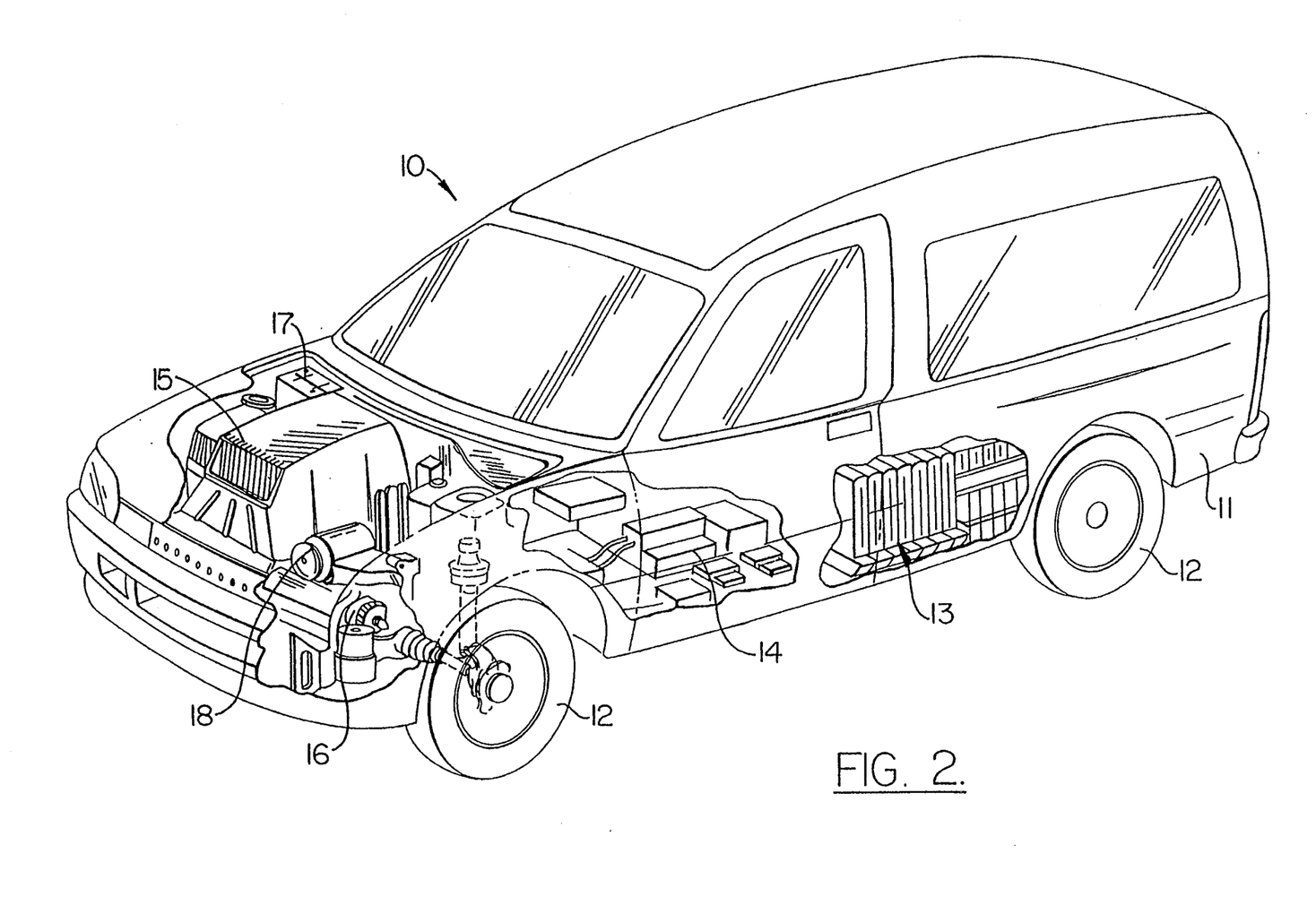
FIG. 2 is a perspective schematic fragmentary view of an electric vehicle according to the present invention.

Referring first to FIG. 2 the drive train and its associated components are illustrated installed in an electric vehicle 10 according to the invention. The vehicle 10 includes a body 11 that may be carried by a separate supporting frame, or the vehicle may be of unibody construction thereby having a body with an integral frame, as would be readily understood by those skilled in the art. The vehicle's wheels 12 are rotatably mounted to the frame. As would also be readily understood by those skilled in the art, in addition to applicability to an all-electric vehicle 10 as described herein, the drive train according to the present invention may also have applicability to hybrid types of electric vehicles which include an additional power source, such as an internal combustion engine.

A traction battery 13 is carried by the frame of the vehicle 10 in a lower medial and rearward portion to thus provide a lower center of gravity and more even weight distribution between the front and rear wheels. As would be readily appreciated by those skilled in the art, the traction battery 13 preferably comprises a plurality of rechargeable interconnected battery cells.

The vehicle 10 preferably includes a Vehicle Control Unit (VCU) 14 which, among other tasks, determines and sends a desired torque request signal to a control computer for a DC-to-AC inverter, both of which are enclosed within a protective housing 15 under the hood of the vehicle. The desired torque request signal is processed by the control computer for the DC-to-AC inverter to drive the electric motor 16 to the desired torque output magnitude, and in the desired rotational direction corresponding to the intended direction of vehicle movement.

The electric motor 16 may preferably be an induction motor utilizing some form of vector control. However, those skilled in the art will recognize that other types of electric motor drives having a readily controllable output torque magnitude may also be used. The vehicle 10 may also preferably include other related components, such as a twelve volt accessory battery 17 and an electrically-powered air conditioning compressor 18.

Figure 3:
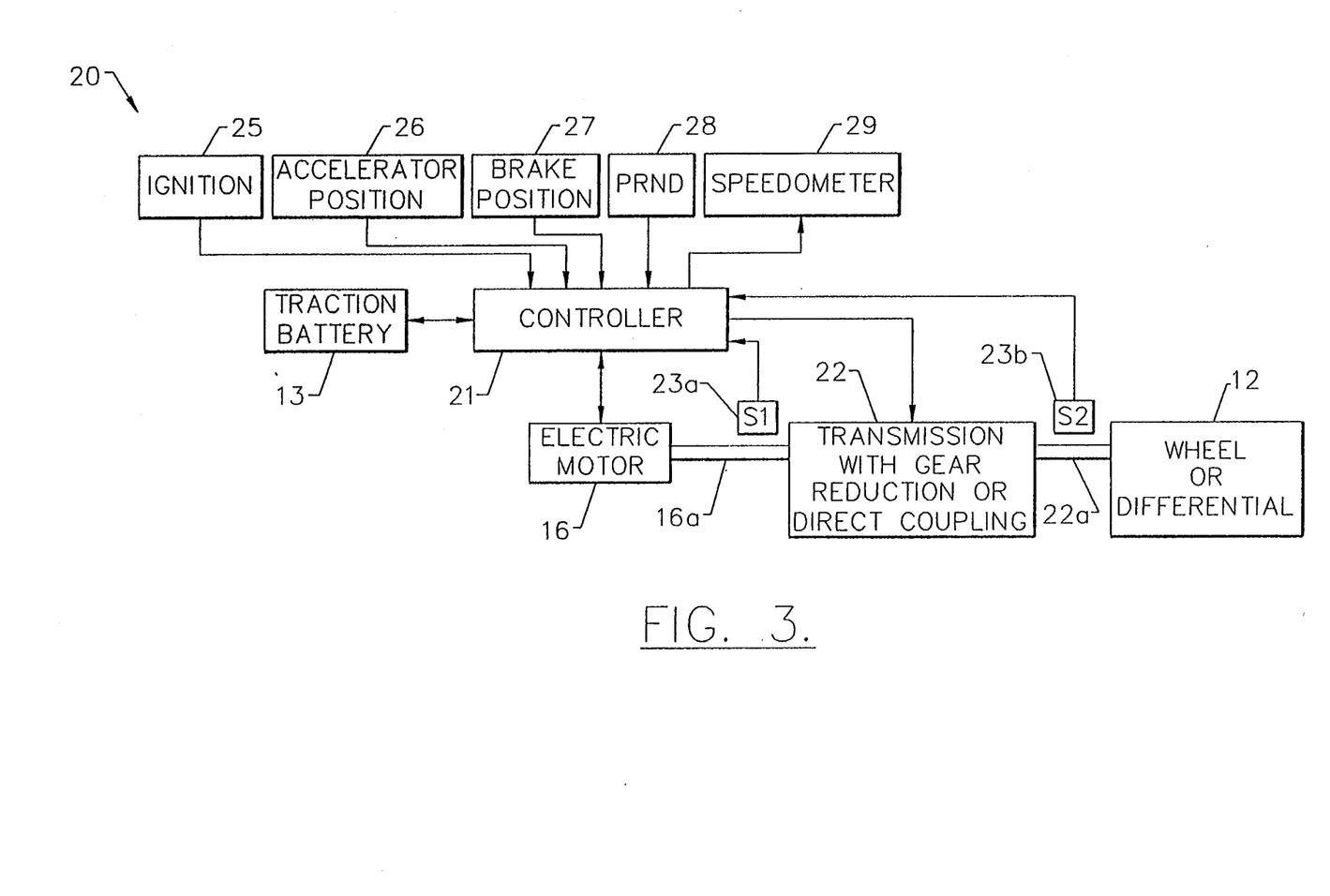
FIG. 3 is a schematic block diagram of an electric vehicle drive train according to the invention.
Figure 4:
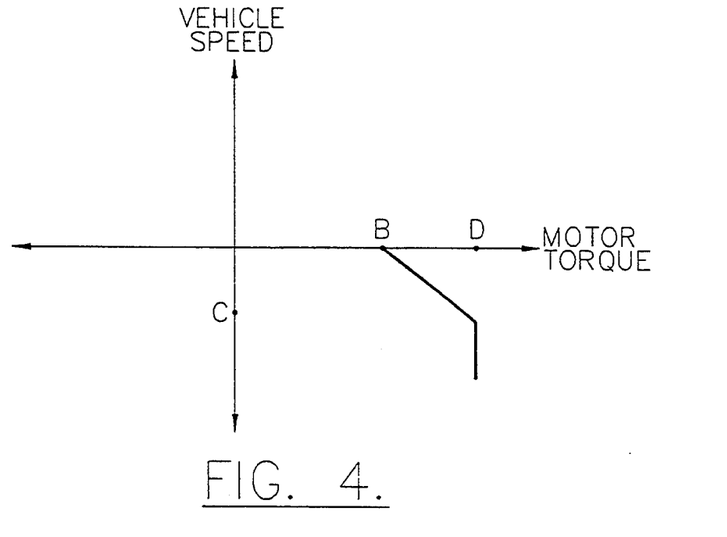
FIG. 4 is a graph of vehicle speed versus motor torque illustrating a linear function of torque output versus speed according to one embodiment of the present invention.
Figure 5:
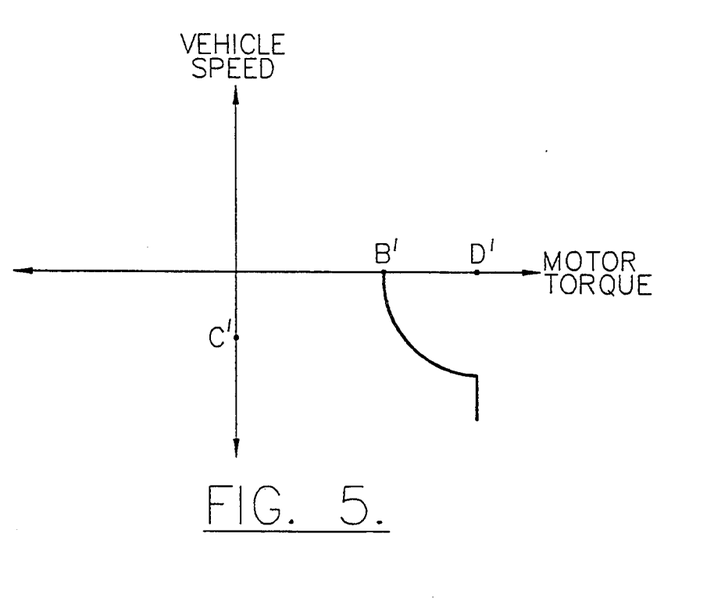
FIG. 5 is a graph of vehicle speed versus motor torque illustrating torque output as a function of the speed squared according to another embodiment of the present invention.

Referring now additionally to FIGS. 3–5, the drive train 20 according to the present invention is further explained. The drive train components are controlled by control means, such as including the controller 21 as illustrated. The controller 21 preferably includes one or more microprocessors operating under stored program control. For example, the control means may be provided by the VCU 14 and/or the control computer associated with the DC-to-AC inverter (FIG. 2).

As would be readily understood by those skilled in the art, the controller 21 may receive inputs from an "ignition" switch 25, an accelerator position transducer 26, a brake position transducer 27, and a gear selector (PRND) 28 for operating the electric motor 16 for driving and braking the vehicle. The gear selector 28 provides selector means for permitting a driver to select an intended or desired direction of vehicle movement, that is, either "D" for forward movement, and "R" for reverse movement.

The controller 21 delivers power from the traction battery 13 to the electric motor 16 during normal driving. The electric motor 16 is rotatable in opposite directions which correspond to respective opposite directions of vehicle movement. In addition, the controller 21 may also operate the motor 16 in a regenerative braking mode wherein the motor is operated as a generator to slow the vehicle, while simultaneously recharging the traction battery 13.

The electric motor 16 is connected to drive one or more of the vehicle wheels 12 directly or through a transmission 22 as shown in the illustrated embodiment. A differential, not shown, may be used to permit a single motor to drive a set of vehicle wheels. The electric motor 16 includes an output shaft 16a coupled to an input of the transmission 22. The transmission 22, in turn, includes an output shaft 22a coupled to one or more of the vehicle wheels 12 as shown in the illustrated embodiment. First and second sensors 23a, 23b are preferably associated with respective shafts of the electric motor 16 and the transmission 22. The sensors 23a, 23b preferably provide both the rotational speed and the direction of rotation for the electric motor 16 and transmission 22, respectively.

The controller 21 includes rollback detection and compensation means responsive to the sensing means 23a and selector means 28 for determining vehicle rollback and for operating the electric motor 16 to counteract the vehicle rollback. Vehicle rollback is defined by a sensed direction of actual vehicle movement opposite to a selected direction of intended vehicle movement. The sensed direction of vehicle movement corresponds to a respective rotational direction of the electric motor 16.

The rollback detection and compensation means counteracts vehicle rollback particularly even in the absence of driver selection of one of vehicle braking or acceleration. In other words, the drive train 20 of the present invention will closely mimic the operation of an automatic transmission in a conventional gasoline-fueled vehicle, by preventing substantial rollback when starting upward on a hill.

As would be readily understood by those skilled in the art, the rollback detection and compensation means of the drive train 20 preferably counteracts "backward" rollback when the forward or "D" position is selected and the vehicle is facing up an incline. To more clearly convey the invention, the following description is directed to the case of starting upward on an incline in the forward direction. Those of skill in the art will readily appreciate the similar case contemplated by the invention for counteracting "forward" rollback when the "R" position is selected and the vehicle is facing backwards up an incline.

As would also be readily understood by those skilled in the art, in addition to assisting in starting upward on an incline, the rollback detection and compensation means also advantageously provides a smooth transition when the vehicle is accidentally shifted into reverse, for example, while the vehicle is moving in a forward direction. In addition, the rollback detection and compensation means may also take up gear lash and any spring in the drive shaft(s) to thereby provide smoother starting on a hill.

The rollback detection and compensation means includes means for controlling an output torque magnitude of the electric motor 16 as a nonconstant function of rotational speed of the motor during vehicle rollback. In one embodiment, the output torque magnitude of the electric motor is a linear function of the sensed rotational speed of the electric motor as shown in the graph of FIG. 4. The upper right hand quadrant of the graph indicates the case where forward is selected as the intended direction of vehicle movement and the vehicle is moving in the forward direction, such as during normal driving. The lower right hand quadrant of the graph represents a rollback condition wherein a "positive" torque is being produced, while the vehicle moves in a backward unintended direction.

Accordingly, a linear function of torque output versus speed provides the electric motor output torque magnitude to counteract the vehicle rollback. The linear function intersects the x-axis for torque at Point B. As also shown in the graph, if the motor speed, and corresponding vehicle speed, is greater than a predetermined value (Point C) on the y-axis, the motor output torque is maintained at a constant level indicated by Point D on the x-axis until the vehicle slows and the torque then follows the linear portion of the curve.

As an example of the linear function, for an electric vehicle weighing about 3500 lbs and a motor-to-wheel ratio of 12:1, and a wheel rolling radius of 1 ft, a torque magnitude of about 110 lb ft is required to hold the vehicle on a 30% grade. The 30% grade is the typical maximum grade specification for an automobile. For the vehicle and grade given, if the vehicle is limited to a maximum rollback speed of about 1.5 mph (a 100 RPM speed of the motor) the vehicle will be moving backward at a speed of about 1.5 ft/sec. Thus, a gain constant can be chosen to provide 100 lb ft and 100 RPM, or one lb ft per RPM. As would be readily understood by those skilled in the art, various gain constants can be used to adjust for a wide range of vehicles and other specific rollback speeds.

In addition to the linear torque output function, a torque output function versus a square of the speed may also be implemented if a "stiffer" or quicker recovery from rollback is desired as shown in the graph of FIG. 5. As illustrated in FIG. 5, this function would also preferably include a constant torque above a predetermined speed value as described above. The points indicated in prime notation in FIG. 5 are similar to those of FIG. 4. Other functions of output torque magnitude versus vehicle speed are also contemplated by the invention.

Another aspect of the invention is that the rollback detection and compensation means includes means for generating a first torque request value as a function of rotational speed of the electric motor during vehicle rollback. The control means, such as the VCU 14 (FIG. 2) also includes means for generating a second torque request value responsive to the driver's selection of acceleration. Accordingly, the rollback detection and compensation means preferably includes means for adding the first and second torque request values together to control the magnitude of the torque output of the electric motor.

Figure 6:
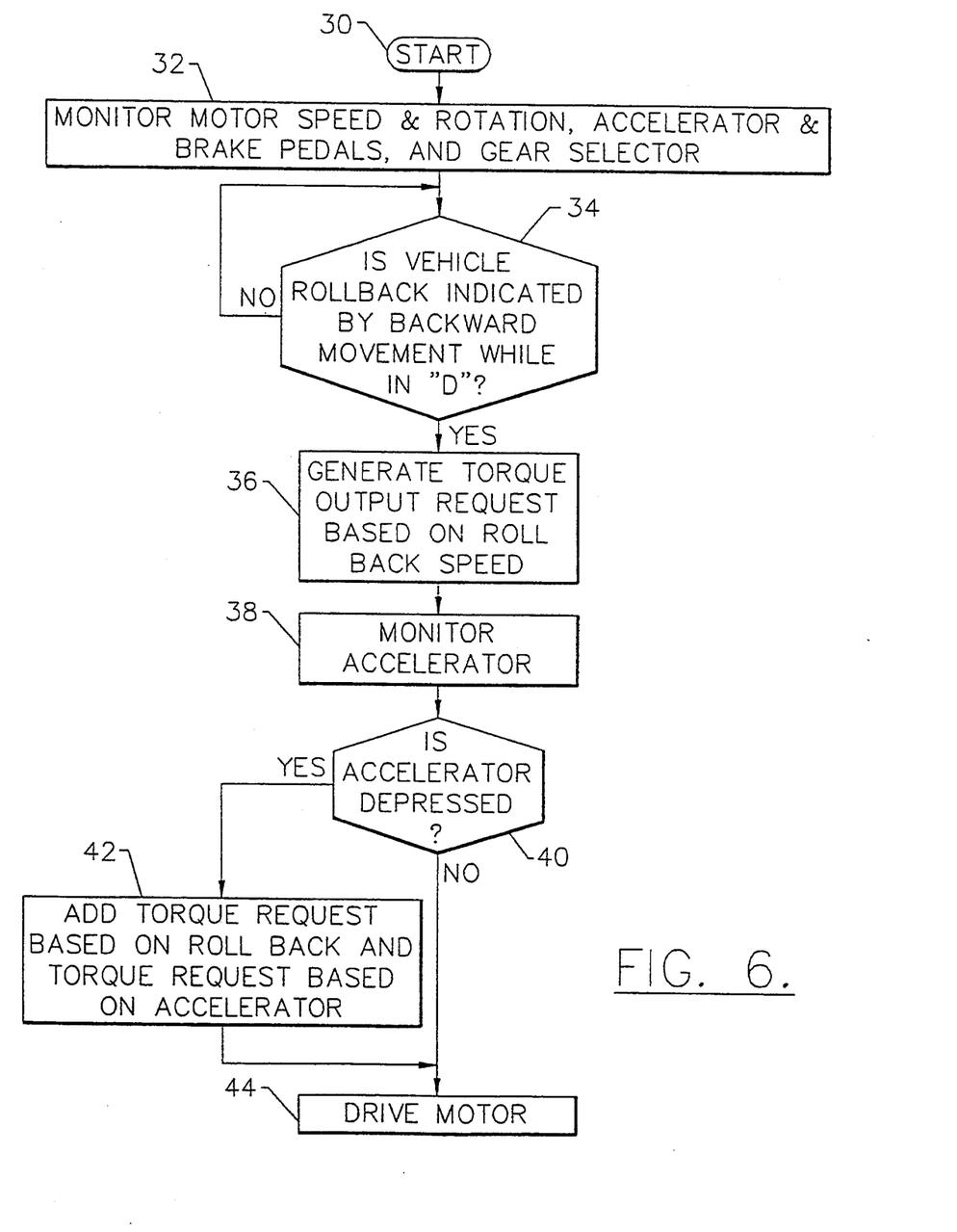
FIG. 6 is a flow chart block diagram illustrating operation of the drive train for an electric vehicle according to the present invention.

Referring now to the flowchart of FIG. 6, operation of the drive train according to the invention is explained. It will be understood that these operations are preferably preferred by a stored program in the control means although they may be performed using other elements as well. After the start Block 30, the motor speed and rotation, the brake and accelerator pedal position, and gear selector are all monitored (Block 32). At Block 34 a rollback determination is made based upon a backward movement of the vehicle while the "D" or forward direction is selected by the driver.

If vehicle rollback is indicated at Block 34, a torque request output value is determined as a function of the rollback speed at Block 36. As described in greater detail above, the torque output function may be linear, or based upon the square of the speed, or may be based upon some other nonconstant function of speed. The accelerator is monitored, and if the accelerator is not depressed (Block 40), the motor is driven at Block 44 by the torque request output value alone. If the accelerator has been depressed by the driver at Block 40, the torque request based upon rollback is added to a torque request based upon the accelerator position to drive the motor (Block 44), thereby providing a smooth start upward on an incline. As would be readily understood by those skilled in the art, similar function relationships may be readily applied for the rollback case where "R" is selected and the vehicle is facing backwards up an incline.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A drive train for an electric vehicle, said drive train comprising:
   an electric motor for driving one or more wheels of the vehicle and being rotatable in opposite directions corresponding to respective opposite directions of actual vehicle movement, said electric motor having a controllable torque output magnitude;
   sensing means associated with said electric motor for sensing rotational speed and direction thereof;
   selector means for permitting driver selection of a direction of intended vehicle movement; and
   rollback detection and compensation means connected to said electric motor, and responsive to said sensing means and said selector means, for determining vehicle rollback defined by a sensed direction of actual vehicle movement opposite to a selected direction of intended vehicle movement and for controlling the output torque magnitude of said electric motor responsive to sensed rotational speed of said electric motor and as a predetermined function thereof to counteract the vehicle rollback.

2. A drive train according to claim 1 wherein said rollback detection and compensation means includes means for controlling the output torque magnitude of said electric motor as a nonconstant function of rotational speed of said electric motor during vehicle rollback.

3. A drive train according to claim 1 wherein said rollback detection and compensation means includes means for controlling the output torque magnitude of said electric motor as a linear function of rotational speed of said electric motor during vehicle rollback.

4. A drive train according to claim 1 wherein said rollback detection and compensation means includes means for controlling the output torque magnitude of said electric motor as a function of rotational speed squared of said electric motor during vehicle rollback.

5. A drive train according to claim 1 wherein said rollback detection and compensation means includes means for controlling the output torque magnitude of said electric motor at a predetermined constant value responsive to a rotational speed of said electric motor being above a predetermined value.

6. A drive train according to claim 1 further comprising a traction battery connected to said electric motor.

7. A drive train for an electric vehicle, said drive train comprising:
a traction battery;
an electric motor connected to said traction battery for driving one or more wheels of the vehicle, said electric motor being rotatable in opposite directions corresponding to respective opposite directions of actual vehicle movement, said electric motor having a controllable torque output magnitude;
sensing means associated with said electric motor for sensing rotational speed and direction thereof;
selector means for permitting driver selection of a direction of intended vehicle movement; and
rollback detection and compensation means connected to said electric motor, and responsive to said sensing means and said selector means, for determining vehicle rollback defined by a sensed direction of actual vehicle movement opposite to a selected direction of intended vehicle movement and for controlling the output torque magnitude of said electric motor responsive to sensed rotational speed of said electric motor and as a nonconstant function thereof to counteract the vehicle rollback.

8. A drive train according to claim 7 wherein said rollback detection and compensation means includes means for controlling the output torque magnitude of said electric motor as a linear function of rotational speed of said electric motor during vehicle rollback.

9. A drive train according to claim 8 herein said rollback detection and compensation means includes means for controlling the output torque magnitude of said electric motor as a function of rotational speed squared of said electric motor during vehicle rollback.

10. A drive train according to claim 9 wherein said rollback detection and compensation means includes means for controlling the output torque magnitude of said electric motor at a predetermined constant value responsive to a rotational speed of said electric motor being above a predetermined value.

11. A drive train for an electric vehicle, said drive train comprising:
an electric motor for driving one or more of wheels of the vehicle and being rotatable in opposite rotational directions corresponding to opposite directions of vehicle movement, said electric motor having a controllable torque magnitude;
sensing means associated with said electric motor for sensing rotational speed and direction thereof;
selector means for permitting driver selection of a direction of intended vehicle movement;
driver input means for permitting driver selection of vehicle braking or vehicle acceleration; and
control means connected to said electric motor for controlling the output torque magnitude and rotational direction thereof in response to said driver input means, said control means further comprising rollback detection and compensation means responsive to said sensing means and said selector means for determining vehicle rollback defined by a sensed direction of actual vehicle movement opposite to a selected direction of intended vehicle movement and for controlling the output torque magnitude of said electric motor responsive to sensed rotational speed of said electric motor and as a nonconstant function thereof to thereby counteract the vehicle rollback even in an absence of driver selection of one of vehicle braking and vehicle acceleration.

12. A drive train according to claim 11 wherein said rollback detection and compensation means comprises means for generating a first torque request value as a nonconstant function of rotational speed of said electric motor during vehicle rollback, wherein said control means comprises means for generating a second torque request value responsive to said driver input means during vehicle rollback, and wherein said control means further comprises means for adding the first and second torque request values for controlling the output torque magnitude of said electric motor.

13. A drive train according to claim 11 wherein said control means includes means for controlling the output torque magnitude of said electric motor as a linear function of rotational speed of said electric motor during vehicle rollback.

14. A drive train according to claim 11 wherein said control means includes means for controlling the output torque magnitude of said electric motor as a function of rotational speed squared of said electric motor during vehicle rollback.

15. A drive train according to claim 11 wherein said control means includes means for controlling the output torque magnitude of said electric motor at a predetermined constant value responsive to a rotational speed of said electric motor being above a predetermined value.

16. A drive train according to claim 11 further comprising a traction battery connected to said electric motor.

17. An electric vehicle comprising:
a frame;
one or more vehicle wheels rotatably mounted on said frame;
a traction battery carried by said frame;
an electric motor connected to said traction battery for driving one or more wheels of the vehicle, said electric motor being rotatable in opposite directions corresponding to respective opposite directions of actual vehicle movement, said electric motor having a controllable torque output magnitude;
sensing means associated with said electric motor for sensing rotational speed and direction thereof;
selector means for permitting driver selection of a direction of intended vehicle movement;
driver input means for permitting driver selection of vehicle braking or vehicle acceleration; and
control means connected to said electric motor for controlling the output torque magnitude and rotational direction thereof in response to said driver input means, said control means further comprising rollback detection and compensation means responsive to said sensing means and said selector means for determining vehicle rollback defined by a sensed direction of actual vehicle movement opposite to a selected direction of intended vehicle movement and for controlling the output torque magnitude of said electric motor responsive to sensed rotational speed of said electric motor and as a nonconstant function thereof to thereby counteract the vehicle rollback even in an absence of driver selection of one of vehicle braking and vehicle acceleration.

18. A drive train according to claim 17 wherein said rollback detection and compensation means comprises means for generating a first torque request value as a function of rotational speed of said electric motor during vehicle rollback, wherein said control means comprises means for generating a second torque request value responsive to said driver input means during vehicle rollback, and wherein said control means further comprises means for adding the first and second torque request values for controlling the output torque magnitude of said electric motor.

19. A drive train according to claim 17 wherein said control means includes means for controlling the output torque magnitude of said electric motor as a linear function of rotational speed of said electric motor during vehicle rollback.

20. A drive train according to claim 17 wherein said control means includes means for controlling the output torque magnitude of said electric motor as a function of rotational speed squared of said electric motor during vehicle rollback.

21. A drive train according to claim 17 wherein said control means includes means for controlling the output torque magnitude of said electric motor at a predetermined constant value responsive to a rotational speed of said electric motor being above a predetermined value.

22. A method for operating an electric vehicle including an electric motor for driving one or more wheels of the vehicle and being rotatable in opposite directions corresponding to respective opposite directions of actual vehicle movement, and a selector for permitting driver selection of a direction of intended vehicle movement, said method comprising the steps of:

sensing a rotational direction of the electric motor corresponding to a respective direction of actual vehicle moment;

determining vehicle rollback defined by the sensed direction of actual vehicle movement being opposite the intended direction of vehicle movement;

sensing a rotational speed of the electric motor corresponding to a respective speed of actual vehicle movement; and controlling an output torque magnitude of the electric motor responsive to the sensed rotational speed of the electric motor and as a predetermined function thereof to counteract the vehicle rollback.

23. A method according to claim 22 wherein the step of controlling the electric motor to counteract the vehicle rollback comprises controlling the electric motor at an output torque magnitude as a nonconstant function of sensed rotational speed of the electric motor.

24. A method according to claim 23 wherein the step of controlling the electric motor at an output torque magnitude comprises controlling the electric motor at an output torque as a linear function of sensed rotational speed of the electric motor.

25. A method according to claim 23 wherein the step of controlling the electric motor at an output torque magnitude comprises controlling the electric motor at an output torque as a function of sensed rotational speed squared of the electric motor.

26. A method according to claim 22 wherein the step of controlling the electric motor to counteract the vehicle rollback comprises controlling the electric motor even in an absence of driver selection of one of vehicle braking and vehicle acceleration.

27. A method according to claim 26 further comprising the steps of generating a first torque request value as a nonconstant function of rotational speed of said electric motor during vehicle rollback, and generating a second torque request value responsive to driver input for either of braking or acceleration of the vehicle; and wherein the step of operating the electric motor comprises adding the first and second torque request values for operating the electric motor.

* * * * *

UNITED STATES PATENT AND TRADEMARK OFFICE
CERTIFICATE OF CORRECTION

| | | |
|---|---|---|
| PATENT NO. | : 5,376,869 | Page 1 of 1 |
| APPLICATION NO. | : 08/016551 | |
| DATED | : December 27, 1994 | |
| INVENTOR(S) | : Charles E. Konrad | |

It is certified that error appears in the above-identified patent and that said Letters Patent is hereby corrected as shown below:

Col. 11, line 1 (Claim 18), delete "A drive train" and
    substitute therefore -- An electric vehicle --;

Col. 11, line 13 (Claim 19), delete "A drive train" and
    substitute therefore -- An electric vehicle --;

Col. 11, line 19 (Claim 20), delete "A drive train" and
    substitute therefore -- An electric vehicle --; and Col. 11, line 24 (Claim 21), delete "A drive train" and
    substitute therefore -- An electric vehicle --.

Signed and Sealed this
Twenty-eighth Day of June, 2011

David J. Kappos
*Director of the United States Patent and Trademark Office*